(12) United States Patent
Andersson

(10) Patent No.: US 6,585,169 B2
(45) Date of Patent: Jul. 1, 2003

(54) APPARATUS AND METHOD FOR THE FORMATION OF DROPLETS FROM A LIQUID

(75) Inventor: Alf Andersson, Ödåkra (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/816,172

(22) Filed: Mar. 26, 2001

(65) Prior Publication Data

US 2001/0028002 A1 Oct. 11, 2001

Related U.S. Application Data

(63) Continuation-in-part of application No. PCT/SE99/01602, filed on Sep. 14, 1999.

(30) Foreign Application Priority Data

Sep. 25, 1998 (SE) ................................. 9803283

(51) Int. Cl.⁷ ............................................. B05B 17/04
(52) U.S. Cl. .................... 239/7; 239/224; 239/222.13; 239/217; 239/383
(58) Field of Search ................. 239/224, 222.11, 239/223, 222.13, 214.15, 214.21, 217, 380, 381, 382, 383, 7

(56) References Cited

U.S. PATENT DOCUMENTS

| | | | | |
|---|---|---|---|---|
| 1,674,631 A | * | 6/1928 | Benninger | ................. 239/224 |
| 2,087,627 A | * | 7/1937 | Nyrop | ........................ 239/224 |
| 2,700,576 A | * | 1/1955 | Salsas-Serra et al. | .. 239/222.11 |
| 3,171,600 A | * | 3/1965 | Eckey | ........................ 239/220 |
| 3,744,774 A | * | 7/1973 | Huisman et al. | ............ 239/224 |
| 4,323,523 A | | 4/1982 | Ueda et al. | |
| RE31,590 E | | 5/1984 | Mitsui | |
| 4,978,069 A | | 12/1990 | Andersson et al. | |
| 6,062,487 A | * | 5/2000 | Bedetti | ........................ 239/223 |

FOREIGN PATENT DOCUMENTS

FR          2 721 537          12/1995

* cited by examiner

Primary Examiner—Michael Mar
Assistant Examiner—Dinh Q. Nguyen
(74) Attorney, Agent, or Firm—Burns, Doane, Swecker & Mathis, LLP

(57) ABSTRACT

Droplets are formed from a liquid by supplying liquid to a feeding rotor and rotating the feeding rotor about an axis to discharge the liquid generally radially outwardly by centrifugal force. A distributor disposed radially outside of the feeding rotor is rotated relative to the feeding rotor about the axis to receive liquid discharged from the feeding rotor. A slinger disposed radially outside of the distributor is rotated relative to the distributor about the axis to receive liquid discharged from the distributor by centrifugal force. The slinger slings that received liquid is slung outwardly in the form of droplets from cusps distributed circumferentially around an outer periphery of the slinger.

23 Claims, 2 Drawing Sheets

APPARATUS AND METHOD FOR THE FORMATION OF DROPLETS FROM A LIQUID

This is a continuation-in-part of International Application No. PCT/SE99/01602 filed Sep. 14, 1999, and published by the International Bureau in English on Apr. 6, 2000, which designates the United States.

TECHNICAL FIELD AND BACKGROUND

The present invention relates to an apparatus and a method for the formation of droplets from a liquid. The apparatus is of the type comprising a feeder, a distributor rotating about an axis at a first angular velocity, and a slinger rotating about the axis at a second angular velocity different from the first angular velocity. At least part of the slinger is radially outside the distributing distributor. The slinger has peripheral droplet-forming cusps on at least two axial levels. The feeder transfers liquid to the distributor which, by its rotation in the circumferential direction distributes the liquid to the levels of the slinger. The slinger, due to its rotation, transfers the liquid to the peripheral droplet-forming cusps, from which the liquid is slung outwardly in the form of droplets.

Such an apparatus is known from U.S. Pat. No. 4,978,069.

The apparatuses disclosed in that patent involve rotating the distributor and the slinger at respective absolute angular velocities which differ from each other in order to provide a relative rotation between the distributor and the slinger. The absolute rotation of the distributor results in the liquid being slung from the distributor towards the slinger. The absolute rotation of the slinger results in each liquid-receiving point of the slinger repeatedly assuming all positions in the circumferential direction. The relative rotation between the slinger and the distributor results in each liquid-receiving point of the slinger receiving liquid from the entire periphery of the distributor. Thus, the liquid from the distributor is distributed uniformly in the circumferential direction on the slinger, whereby droplets of equal size can be formed at the droplet-forming cusps of the slinger.

The above-described prior art is used to form substantially spherical droplets from a liquid. Droplets are slung from the peripheral cusps in a tangentially forward direction in relation to the direction of rotation of the slinger, when the centrifugal force acting on the liquid exceeds the force of adhesion at each cusp. As seen in the direction of the axis of rotation, successively slung droplets will follow diverging paths in a chamber surrounding the apparatus. As the paths are divergent, the droplets are prevented from colliding with each other.

The chamber can be heated so that the slung droplets will dry and form solid particles. Alternatively, if the liquid comprises a melt, then the chamber is preferably cooled, whereby the droplets solidify and form solid particles.

In one embodiment of the apparatus disclosed in connection with FIGS. 1–3 of the above-mentioned U.S. Pat. No. 4,978,069, the distributor comprises a hollow cylinder. The wall of the cylinder has a plurality of radial side openings which are uniformly distributed in the axial and circumferential directions. The cylinder rotates in such manner that the liquid transferred thereto forms a film on the inner wall of the cylinder and is subsequently pressed out of the side openings to be slung onto the slinger.

The slinger comprises a plurality of axially distributed slinger rotors, the number of which corresponds to the number of axially arranged side openings of the distributor and which rotate in unison at an angular velocity different from the angular velocity of the distributor. As a result, a uniform circumferential distribution of the liquid onto the slinger rotors is ensured.

If the side openings of the distributor cylinder are of equal size, the liquid passes therethrough at the same pressure drop. As a result, the same amount of liquid passes through each one of the side openings, and is uniformly divided among the respective slinger rotors.

However, this embodiment of U.S. Pat. 4,978,069 suffers from a number of drawbacks. Firstly, if the liquid tends to form surface coatings, then the side openings of the distributor can become partially clogged. This means that variations may occur in the diameters of the side openings, and the distribution accuracy is lost.

Secondly, an increase or decrease of the total flow in the apparatus, even while the diameters of the side openings remain unchanged, results in an increase or a decrease of the pressure drop. As a result, the total flow, and thus the production volume, can be varied within a narrow range only. For instance, if the total flow is so small as to be insufficient to fill the side openings, the pressure drop disappears, and consequently the distribution accuracy is lost.

In a second embodiment of the apparatus described in connection with FIGS. 4–5 of U.S. Pat. No. 4,978,069, those problems are solved. That embodiment also has a distributor in the form of a rotating hollow cylinder but has a conical inner wall whose narrow end faces the feeder. At this narrow end, a receiving space is defined within the cylinder, the liquid being transferred from the feeding means to said receiving space. A plurality of parallel grooves are formed in an interior wall of the cylinder. The grooves are peripherally uniformly distributed and parallel to the longitudinal direction of the cylinder. Each groove communicates at one end with the receiving space and at the other end with a radial side opening in the cylinder wall. The side openings are uniformly distributed both in the circumferential direction and the axial direction. The slinger comprises a plurality of slinger rotors, which are arranged outside of and concentrically with the distributor. The number of slinger rotors corresponds to the number of axially spaced annular rows of side openings in distribution, the slinger rotors being arranged on the same level as the respective rows of side openings.

The liquid is transferred from the feeder to the receiving space in the distributor, which by its rotation transfers the liquid to the respective grooves of the distribution, which in turn pass the liquid to respective side openings of the distributor. The liquid passes through the side openings without filling them and is then distributed on the slinger rotors in the above-described manner.

Since the side openings in the cylinder are not filled with liquid, this apparatus is not dependent on a pressure drop to distribute the liquid on the slinger rotors, which makes it possible to use a wider production range. Coatings which may be formed by the liquid in the side openings will not throttle the flow through the side openings, since the latter are not filled with the liquid. The negative effects of coatings are thus eliminated.

A disadvantage of this apparatus is, however, that the division of the liquid among the different grooves takes place in an uncontrolled manner. Since the grooves are uniformly distributed in the circumferential direction, an approximately uniform division of liquid is achieved. In spite of this, variations may occur in the division of the liquid, so that some grooves receive a greater amount of liquid than the other grooves. Therefore, some slinger rotors may accidentally receive a greater amount of liquid than other slinger rotors and thus form larger droplets.

Thus, it would be desirable to control in a more reliable way the division of liquid among the different axial levels of the slinger.

A disadvantage which is found in both of the above referenced apparatuses is that problems arise if the apparatus has too great of an axial dimension. This happens if too high a production capacity is desired and use is made of a great number of slinger rotors. The problem is due to the fact that the entire slinger can only be mounted at one of its ends. The reason for this is that the distributor means and the slinger means are normally rotated by means of two respective drive shafts, one of which is arranged within the other. The outer drive shaft operates the distributor means and the inner drive shaft operates the slinger. The feeder is arranged axially above and in direct connection with the distributor, and the slinger is arranged around the distributor. The slinger can thus be connected to the inner drive shaft only in the area below the distributor. Therefore, the lower end of the inner drive shaft projects from the outer drive shaft. If the slinger has too great of an axial length, it may assume a state of disequilibrium during rotation. Such a state of disequilibrium causes vibrations, which may have a serious influence on the quality of the formed droplets.

An object of the present invention is to provide an apparatus and a method for the formation of droplets, which apparatus and which method ensure, from the distributing means, both a uniform division of the liquid among the different levels of the slinger and a uniform distribution of the liquid on the slinger on its respective levels. Stated in other terms, the apparatus and the method should ensure, on the one hand, that the liquid is uniformly divided in the axial direction and, on the other hand, that the liquid is uniformly distributed in the circumferential direction. Moreover, the apparatus should be independent of a pressure drop to provide the axial division of the liquid on the slinger. Furthermore, it is advantageous if the slinger can have an optional axial extent without a state of disequilibrium arising therein.

SUMMARY OF THE INVENTION

In order to achieve this object, an apparatus for forming droplets from a liquid comprises a slinger which is rotatable about an axis and has droplet forming cusps disposed on an outer periphery thereof. The cusps are arranged in the form of at least two annular rows spaced along the axis. A distributor is rotatable about the axis and is disposed radially inside of at least a portion of the slinger for supplying liquid to the slinger by centrifugal force. A feeder includes a feeding rotor rotatable about the axis for supplying the liquid to the distributor by centrifugal force. At least a portion of the feeding rotor is disposed radially inside of the distributor. A drive mechanism is provided for driving rotor, the distributor, and the slinger, wherein the feeding rotor is rotated relative to the distributor.

Preferably, the slinger and the feeding rotor are interconnected to rotate at the same speed and/or in the same direction.

The drive mechanism can rotate a feeding rotor in an opposite direction from the distributor. Alternatively, the drive mechanism can rotate the feeding rotor in the same direction as the distributor and at a different speed than the distributor. The invention also pertains to a method for the formation of droplets from a liquid. The method comprises the steps of:

(a) supplying liquid to a feeding rotor and rotating the feeding rotor about an axis to discharge the liquid generally radially outwardly by centrifugal force;

(b) rotating distributor about the axis with at least a portion of the distributor surrounding the feeding rotor, to receive liquid discharged from the feeding rotor, the distributor being rotated relative to the feeding rotor; and (c) rotating a slinger about the axis, at least a portion of the slinger surrounding the distributor to receive liquid discharged from the distributor by centrifugal force, the liquid being slung outwardly in the form of droplets from cusps distributed circumferentially around an outer periphery of the slinger.

The expression "uniform distribution" as used herein signifies that a liquid is delivered to the distributor and/or the slinger in such a manner that the distributor and/or slinger receives an equal amount of liquid along its entire circumference. Consequently, all of the liquid-receiving points of the distributor and/or slinger will receive the same amount of liquid.

The expression "uniform division" signifies that a liquid is divided such that each of respective levels of the slinger continuously receives a constant, i.e. uniform, amount of liquid. It is thus possible that a volume of liquid supplied to one level may differ from a volume of liquid supplied to another level. Normally, the volumes of liquid are, however, equal.

The term "liquid" as used above and hereinafter shall be considered to also comprise different types of melts.

The liquid droplets slung from the slinger travel through a preferably heated chamber which surrounds the apparatus in order to dry and thus form solid particles. If the liquid is a melt, the chamber is preferably cooled so that the melt will cool and thus solidify into solid particles.

Due to the absolute rotation of the feeding rotor, the liquid is slung from the feeding rotor to the distributor. Due to the absolute rotation of the distributor, it is ensured that each liquid-receiving point of the distributor continuously assumes all the positions in the circumferential direction. Due to the relative rotation between the feeding rotor and the distributor, it is ensured that each liquid-receiving point of the distributor is supplied with liquid from the entire circumference of the feeding rotor. Thus a uniform distribution of the liquid to the distributor in the circumferential direction is ensured. This uniform distribution allows a uniform division of the liquid among the levels of the slinger in the axial direction. Due to the liquid being uniformly distributed on the distributor, no pressure drop is needed for the division of the liquid on the levels of the slinger.

According to a preferred embodiment of the invention, the angular velocity of the feeding rotor corresponds to the angular velocity of the slinger. Owing to this, it is especially possible to connect the slinger to the feeding rotor by means of a rigid connection, so that the slinger can be mounted in bearings at both dimension, whereby the slinger can have a greater axial length. This makes it possible to increase the production capacity of the apparatus.

The apparatus can be arranged so that either of the feeding rotor and the slinger drives the other of the feeding rotor and the slinger. Preferably, the slinger is rigidly connected at one of its ends to a drive shaft and at its other end to the feeding rotor by means of the rigid connection. As a result, the rotation of the feeding rotor is provided by the rotation of the slinger with the aid of the drive shaft.

According to a further embodiment of the invention, the distributor comprises a collection groove which surrounds the axis and which is arranged radially outside of, and is open towards, the feeding rotor to collect the liquid transferred from the feeding rotor to the distributor. Preferably, the distributor has radial discharge openings, which are uniformly distributed in the circumferential direction in the bottom of the groove.

According to yet another embodiment of the invention, the distributor comprises one or more distribution tubes, each having an inlet and an outlet. Preferably, the distributor comprises collection grooves, discharge openings and distribution tubes, the discharge openings each forming an inlet of a distribution tube. Preferably, each distribution tube extends substantially in parallel with the axis, the outlet of each distribution tube advantageously ending on one of said levels of the slinger. Preferably, the outlets of the distribution tubes are arranged on the underside of the distributor.

According to yet another preferred embodiment of the invention, the slinger comprises a slinger rotor arranged on each level.

According to a particularly preferred embodiment of the invention, the apparatus comprises a plurality of distribution tubes and a plurality of slinger rotors, the outlet of at least one distribution tube being arranged on a level with each level, on which a slinger rotor is arranged.

According to yet another particularly preferred embodiment, each slinger rotor comprises a radially inner portion, which extends radially outwards and upwards, and a radially outer portion, which extends substantially radially outwards and along the periphery of which the droplet-forming cusps are arranged.

The embodiments of the invention described above can be combined with each other in optional manner.

The method of the invention makes it possible, on the one hand, to ensure a uniform distribution of liquid on the slinger in the circumferential direction and, on the other hand, to ensure a uniform division of liquid on the slinger in the axial direction. It goes without saying that this uniform division of liquid does not need to be equal on all levels of the slinger. It is possible to supply a great amount of liquid to one level and a small amount of liquid to another level. What is important is that this division should be constant, i.e. uniform, overtime.

BRIEF DESCRIPTION OF THE DRAWINGS

The present invention will now be described by way of example with reference to the accompanying drawings, wherein.

DETAILED DESCRIPTION OF THE PREFERRED EMBODIMENT

Figure 1:
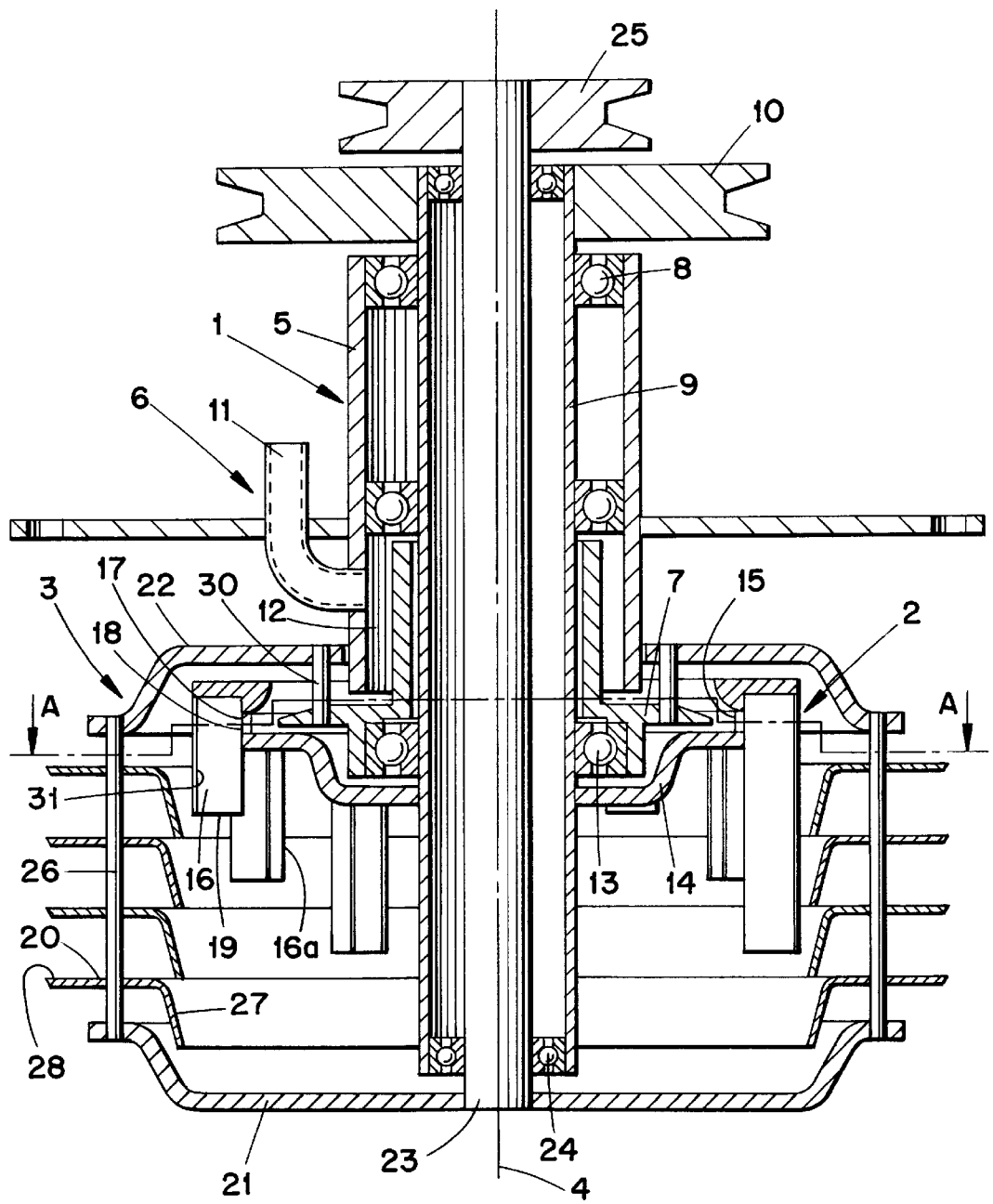
FIG. 1 is a longitudinal sectional view of an embodiment of the invention.
Figure 2:
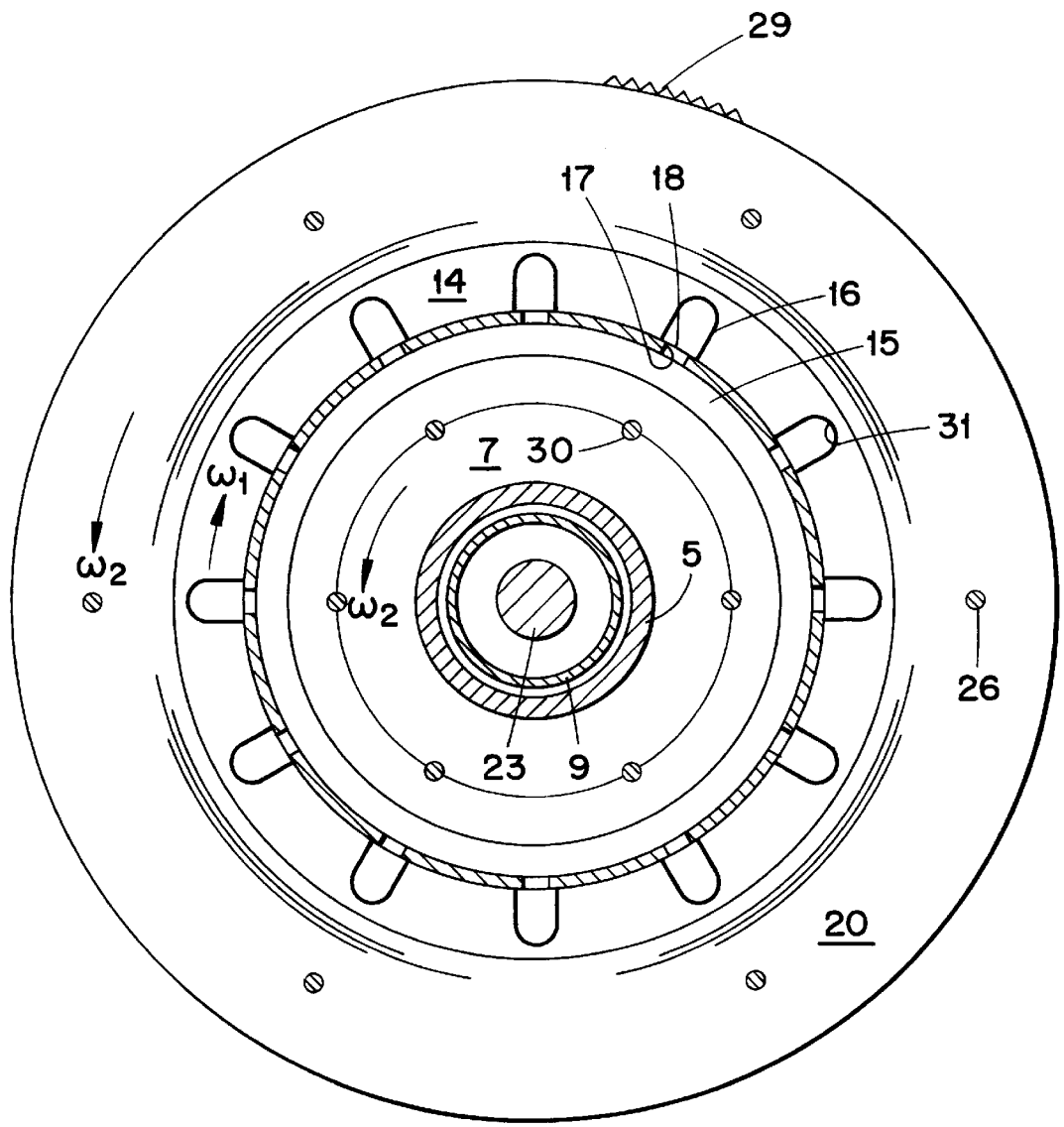
FIG. 2 is a cross-sectional view along the line A—A of the embodiment shown in FIG. 1.

FIGS. 1 and 2 illustrate a preferred embodiment of an apparatus according to the present invention. The apparatus is composed of a feeder 1, a distributor 2 and a slinger 3. These three devices 1, 2 and 3 are concentrically arranged about an axis 4, with part of the feeder 1 being located radially inside the distributor 2, which in turn is partially located radially inside the slinger 3.

The feeder 1 comprises a stationary, cylindrical housing 5, a liquid supply 6 and a feeding rotor 7. A hollow outer drive shaft 9, whose longitudinal axis coincides with the axis 4, is externally mounted by means of a bearing 8 in the housing 5. The outer drive is rigidly connected at its upper end to a first belt pulley 10 to be rotated by means of a driving motor (not shown) with the aid of a suitable belt arrangement. The supply means comprises a tube 11, one end of which is connected to the housing 5 and ends in a receiving space 12 defined between the outer drive shaft 9 and the housing 5. The outer drive shaft 9 is also externally mounted by means of a bearing 13 disposed in the feeding rotor 7. The feeding rotor 7 is arranged so that liquid supplied to the receiving space 12 through the tube 11 falls down onto the feeding rotor. Thanks to the bearings 8,13, neither the housing 5 nor the feeding rotor 7 will rotate as the first drive shaft 9 rotates.

The distributor 2 comprises a cup-shaped distribution disk 14 having a collection groove 15 and a plurality of axial distribution tubes 16. The distribution disk 14 is rigidly connected to the outer drive shaft 9 and can thus be rotated by the rotation of the drive shaft 9. The groove 15 is on a level with and open towards the feeding rotor 7. The distribution tubes 16 are uniformly distributed in the circumferential direction and extend axially downwards from the distribution disk 14. The distribution tubes 16 are of U-shaped cross section, their open sides being directed radially inwards, as shown in FIG. 2. It is also shown in FIG. 2 that the collection groove 15 has openings 17 which extend in the radial direction and each forming an inlet 18 of a respective distribution tube 16. Finally, the distribution tubes 16 are so formed that each one of them has a lower outlet 19, which ends at one of a plurality of levels under the distribution disk 14.

The slinger 3 comprises a plurality of axially distributed slinger rotors 20 as well as a bottom plate 21 and a top plate 22. The slinger rotors 20 and the plates 21, 22 are concentric with the axis 4. The bottom plate 21 is connected to a central drive shaft 23, which is concentrically mounted inside the outer drive shaft 9 by means of bearings 24 and rigidly connected at its upper end to a second belt pulley 25, which is via a belt operable by means of a motor (not shown). The bottom plate 21 supports the slinger rotors 20 and the top plate 22 by means of a plurality of struts 26. The number of slinger rotors 20 corresponds to the number of levels on which the outlets 19 of the distribution tubes 16 end, said slinger rotors being arranged on a level with said levels. The slinger rotors 20 are of a conventional type and they each have a radially inner portion 27, which extends radially outwards-upwards, and a radially outer portion 28, which extends radially outwards. Droplet forming cusps, some of which are schematically shown at 29 in FIG. 2, are peripherally arranged on the outer portion 28 of each slinger rotor 20.

The droplet-forming cusps 29, which are circumferentially equidistant and uniform, can be "saw-toothed" pointed cusps, or in the form of other types of radially projecting portions. Thus, for example, the expression "droplet-forming cusps" includes: (a) radially projecting closely arranged rods or the like, (b) radially projecting nonpointed bulges, formed for example by a wave-shaped peripheral edge of the slinger rotors 20, (c) radially projecting portions whose height extending perpendicular to the plane of the slinger rotor 20 is less than the thickness of the slinger rotor 20; this item (c) can be achieved, for example, by mounting two circular disks which have the same diameter and one of which has a periphery provided with cusps, while the other has a smooth periphery, with their main surfaces facing one another and with the cusp-bearing disk arranged uppermost, such that the points of the cusps coincide with the peripheral edge of the lower disk, and (d) other radially projecting portions providing the desired liquid distribution effect.

Finally, the apparatus comprises a rigid connection, which connects the top plate 22 to the feeding rotor 7. The connection is formed of a plurality of axial struts 30, which connect the top plate 22 to the feeding rotor 7.

In operation, the feeding rotor 7, the distributor 2 and the slinger 3 are rotated simultaneously about a common axis to cause liquid to be transferred from the feeding rotor 7 to the distributor 2 and then to the slinger 3. It is desirable to uniformly distribute the liquid in the collection groove 15 of the distributor 2. That is achieved by producing relative rotation between the feeling rotor 2 and the distributor 2. For instance, if the distributor 2 is rotated in the same direction as the feeding rotor 7, then uniform distribution can be achieved if the outer drive shaft 9 rotates at an angular velocity $\omega 1$, which is of different magnitude from the angular velocity $\omega 2$ of the central drive shaft 23. As a result, the distributor 2 will rotate at the angular velocity $\omega 1$ and both the slinger 3 and the feeding rotor 7 will rotate at the different angular velocity $\omega 2$. Preferably, however, the relative rotation is produced by rotating the drive shaft 9 (and the distributor 2) in an opposite direction from the shaft 23 (and the feeding rotor 7), whereby the uniform distribution of liquid in the groove 15 can be achieved even if the angular velocities $\omega 1$ and $\omega 2$ are equal.

The feeding means 1 is continuously supplied with a liquid from the tube 11. The liquid is thus passed to the receiving space 12 and then to the feeding rotor 7.

Due to the rotation of the feeding rotor 7, the liquid is conducted radially outwards, by centrifugal action, to the outer periphery of the feeding rotor 7, from where the liquid is slung tangentially forward.

The liquid is then collected by the collection groove 15 of the distribution disk 14 either directly, or indirectly, after having reached the distribution disk 14 and then slid along the distribution disk into the collection groove 15. In the collection groove 15, the liquid will, due to its inertia, flow in a direction corresponding to a direction of rotation of the feeding rotor 7, and be passed into the openings 17.

Owing to the absolute angular velocity $\omega I$ of the distribution disk 14, each opening 17 of the collection groove 15 will continuously assume all of the endless number of circumferential positions. Thanks to the relative rotation between the feeding rotor 7 and the distribution disk 14, it is ensured that liquid is supplied to each opening 17 from the entire periphery of the feeding rotor 7. Thus, the liquid is uniformly distributed in the collection groove 15 and uniformly divided among the openings 17, even if the flow of liquid from the feeding rotor 7 should exhibit differences in intensity in the circumferential direction.

The liquid is passed from the openings 17 to the distribution tubes 16 to flow, under the action of gravity, downwards in the tubes. The centrifugal force causes the liquid to flow along the radially outer inner walls 31 of the U-shaped distribution tubes 16.

As the liquid reaches the outlets 19 of the tubes 16 on the different levels, it will be slung out tangentially forward.

The liquid will then be collected by the slinger rotors 20 on the various levels. Due to the relative rotation between the rotating slinger rotors 20 and the rotating distributor 2, the liquid will be uniformly distributed on the respective slinger rotors 20 as described above with reference to the prior art.

The liquid, which is uniformly divided among the respective slinger rotors 20 and uniformly distributed on the respective slinger rotors 20, will then be passed radially outwards as a film on each slinger rotor 20 to be slung in the form of droplets from the peripheral droplet-forming cusps 29.

If the openings 17 are uniformly distributed in the circumferential direction in the bottom of the groove 15, as shown in FIGS. 1 and 2, then the same amount of liquid will be passed into each opening 17. However, if the openings 17 should not be uniformly distributed in the circumferential direction, different amounts of liquid will be passed into them. As a result, it is possible to ensure in a controlled manner that the liquid is uniformly divided, but in different amounts of liquid, among the slinger rotors 20 of the slinger 3. As a result, droplets having a larger size can be formed on certain levels, which is an advantage if a final product consisting of particles of different sizes is desired. If more distribution tubes 16 end on some levels than on others, the same result can be achieved.

Owing to: (i) the absolute rotation of the feeding rotor 7, (ii) the absolute rotation of the distributor 2, and (iii) the relative rotation between them, the liquid will be uniformly divided among the openings 17 in the groove 15, whereby the liquid will be uniformly divided among the respective slinger rotors 20. Thus, the apparatus according to the present invention ensures that all the slinger rotors 20 are supplied with a uniform amount of liquid.

As occurs in the prior art, the apparatus further ensures that the liquid divided on each slinger rotor 20 is distributed uniformly in the circumferential direction on each slinger rotor 20.

Thus, an apparatus is provided for the formation of droplets in a controlled manner in the circumferential direction and the axial direction.

Moreover, the apparatus is not dependent on a pressure drop to achieve the required division of the liquid on the levels of the slinger 3. Consequently, the production volume can be varied within a relatively wide range.

In addition, as the feeding rotor 7 rotates at the same angular velocity $\omega 2$ as the slinger means 3, it is possible to connect the slinger 3 to the feeding rotor 7 by means of a fixed connection, in the form of the depicted struts 30. As a result, it is possible to telescope the upper end of the slinger 3 relative to the outer drive shaft 9. Accordingly, more slinger rotors 20 than otherwise would be possible can be stacked on each other without a state of disequilibrium arising.

It will, however, be appreciated that this connection between the slinger and the feeding rotor is not necessary to achieve a uniform division of the liquid to the different slinger rotors 20 of the slinger 3. That is, the slinger 3 need not be connected to the feeding rotor 7, but then a separate drive arrangement would be needed for the operation of the feeding rotor 7.

Moreover, it will be appreciated that many combinations and modifications are possible, and therefore the scope of the invention is considered to be limited only by the appended claims.

What is claimed is:

1. Apparatus for forming droplets from a liquid, comprising:
   a slinger rotatable about an axis and having droplet-forming cusps disposed on an outer periphery thereof, the cusps arranged in the form of at least two annular rows spaced along the axis;
   a distributor rotatable about the axis and disposed radially inside of at least a portion of the slinger for supplying liquid to the slinger by centrifugal force;
   a feeder including a feeding rotor rotatable about the axis for supplying the liquid to the distributor by centrifugal force, at least a portion of the feeding rotor being disposed radially inside of the distributor; and a drive mechanism for driving the feeding rotor, the distributor, and the slinger, wherein the feeding rotor and the slinger are rotated relative to the distributor.

2. Apparatus according to claim 1, wherein the slinger and the feeding rotor are interconnected to rotate at the same speed.

3. Apparatus according to claim 2, wherein the slinger and the feeding rotor are interconnected to rotate in the same direction.

4. Apparatus according to claim 3, wherein the drive mechanism is operable to rotate the feeding rotor in an opposite direction from the distributor.

5. Apparatus according to claim 3, wherein the drive mechanism operable to rotate the feeding rotor in the same direction as the distributor and at different speed relative thereto.

6. Apparatus according to claim 1, wherein the slinger and the feeding rotor are interconnected to rotate in the same direction.

7. Apparatus according to claim 1, wherein the drive mechanism is operable to rotate the feeding rotor relative to the distributor.

8. Apparatus according to claim 1, wherein the drive mechanism operable to rotate the feeding rotor in the same direction as the distributor and at different speed relative thereto.

9. Apparatus according to claim 1, wherein the driving mechanism is connected to one of the feeding rotor and the slinger which, in turn, transmits rotation to the other of the feeding rotor and the slinger.

10. Apparatus according to claim 9, wherein the drive mechanism includes a drive shaft, the slinger including first and second axially spaced ends, the first end connected to the drive shaft, and the second end connected to the feeding motor.

11. Apparatus according to claim 1, wherein the distributor includes a collection groove opening toward, and extending around, the feeding rotor for receiving the liquid from the feeding rotor.

12. Apparatus according to claim 11, wherein the distributor includes uniformly circumferentially spaced openings communicating with the collection groove, the openings directed in radial directions and disposed radially outwardly of the groove.

13. Apparatus according to claim 12, wherein the distributor includes distribution tubes spaced circumferentially apart for discharging the liquid toward the slinger, the tubes communicating with respective ones of the openings.

14. Apparatus according to claim 1, wherein the distributor includes distribution tubes spaced circumferentially apart for discharging the liquid toward the slinger.

15. Apparatus according to claim 14, wherein the tubes extend parallel to the axis.

16. Apparatus according to claim 14, wherein the slinger comprises a plurality of slinger rotors distributed along the axis, each slinger rotor including an annular row of the cusps, each tube including an outlet, the outlets disposed at levels corresponding to respective levels of the rows of cusps on the slinger.

17. Apparatus according to claim 16, wherein the tubes extend downwardly from the distributor.

18. Apparatus according to claim 1, wherein the slinger comprises a plurality of slinger rotors distributed along the axis, each slinger rotor including an annular row of the cusps, each slinger rotor including a radially inner portion extending in an upward direction enclosed radially outwardly, and a radially outer portion extending in a radial direction from an upper end of the respective inner portion.

19. Apparatus according to claim 1 wherein the drive mechanism is operable to rotate the feeding rotor in an opposite direction from the distributor.

20. Apparatus for forming droplets from a liquid, comprising:

a slinger rotatable about an axis and having droplet-forming cusps disposed on an outer periphery thereof, the cusps arranged in at least two annular rows spaced along the axis;

a distributor rotatable about the axis and disposed radially inside of at least a portion of the slinger for supplying liquid to the slinger by centrifugal force;

a feeder including a feeding rotor rotatable about the axis for supplying the liquid to the distributor by centrifugal force, at least a portion of the feeding motor being disposed radially inside of the distributor;

a drive mechanism for driving the feeding rotor, the distributor, and the slinger, wherein the feeding rotor and the slinger are rotated relative to the distributor;

the feeding rotor being rigidly coupled to the slinger for rotation therewith at the same velocity and in the same direction;

the distributor including an annular groove opening toward the feeding rotor, a plurality of openings disposed radially outwardly of the grooves and communicating therewith, and tubes extending downwardly and communicating with respective ones of the openings, the tubes including lower outlets for distributing liquid from the respective openings to respective rows of cusps of the slinger.

21. A method for the formation of droplets from a liquid, comprising the steps of:

(a) supplying liquid to a feeding rotor and rotating the feeding rotor about an axis to discharge the liquid generally radially outwardly by centrifugal force;

(b) rotating a distributor about the axis, with at least a portion of the distributor surrounding the feeding rotor to receive liquid discharged from the feeding rotor, the distributor being rotated relative to the feeding rotor; and (c) rotating a slinger relative to the distributor about the axis, at least a portion of the slinger surrounding the distributor to receive liquid discharged from the distributor by centrifugal force, the liquid being slung outwardly in the form of droplets from cusps distributed circumferentially around an outer periphery of the slinger.

22. The method according to claim 21, wherein the feeding rotor and the distributor are rotated in opposite directions from one another.

23. The method according to claim 21, wherein the feeding rotor and the distributor are rotated in the same direction and at different speeds from one another.

* * * * *